(12) United States Patent
Chen

(10) Patent No.: US 6,315,182 B1
(45) Date of Patent: Nov. 13, 2001

(54) CELLULAR PHONE POUCH ASSEMBLY ADAPTED TO BE MOUNTED ON A BAR

(75) Inventor: Li-Fong Chen, Tainan (TW)

(73) Assignee: Co-Union Industry Co., Ltd., Tainan Hsien (TW)

( * ) Notice: Subject to any disclaimer, the term of this patent is extended or adjusted under 35 U.S.C. 154(b) by 0 days.

(21) Appl. No.: 09/620,665

(22) Filed: Jul. 20, 2000

(51) Int. Cl.[7] ............................. B60R 9/00; B60R 11/00
(52) U.S. Cl. ..................... 224/420; 224/425; 224/431; 224/547; 224/271; 224/929
(58) Field of Search ........................ 224/271, 420, 224/425, 428, 431, 547, 441, 447, 448, 450, 929, 197

(56) References Cited

U.S. PATENT DOCUMENTS

| | | |
|---|---|---|
| 4,214,688 | * 7/1980 | Griffin, Jr. . |
| 4,798,318 | * 1/1989 | Irwin . |
| 5,386,961 | * 2/1995 | Lu . |
| 5,406,816 | * 4/1995 | Thomas . |
| 5,529,271 | * 6/1996 | Dunchock . |
| 5,730,342 | * 3/1998 | Tien . |
| 5,735,441 | * 4/1998 | Fujimoto . |
| 5,857,601 | * 1/1999 | Greenwood . |

* cited by examiner

*Primary Examiner*—Gregory Vidovich
(74) *Attorney, Agent, or Firm*—Pitney, Hardin, Kipp & Szuch, LLP

(57) ABSTRACT

A pouch assembly is adapted to hold a cellular phone and is adapted to be mounted on a bar. The pouch assembly includes a pouch body, an inverted U-shaped clip, a bar clamping member, a slideable coupling device, and an interlocking device. The pouch body is adapted to receive the cellular phone therein. The inverted U-shaped clip has an anchoring plate portion secured to the pouch body, a resilient engaging portion disposed behind the anchoring plate portion, and a bridging plate portion interconnecting upper ends of the anchoring and resilient engaging portions. The bar clamping member includes a base wall portion and a bar clamp portion connected to the base wall portion and adapted to clamp the bar. The slideable coupling device is formed on and couples slideably and removably the resilient engaging portion of the clip and the base wall portion of the bar clamping member. The interlocking device is provided on and locks releasably the base wall portion of the bar clamping member against sliding movement relative to the resilient engaging portion of the clip.

8 Claims, 5 Drawing Sheets

CELLULAR PHONE POUCH ASSEMBLY ADAPTED TO BE MOUNTED ON A BAR

BACKGROUND OF THE INVENTION

1. Field of the Invention

The invention relates to a cellular phone pouch assembly, more particularly to one that is adapted to be mounted on a bar.

2. Description of the Related Art

Referring to FIG. 1, a conventional cellular phone pouch assembly 1 is shown to include a pouch body 11 and an inverted U-shaped clip 12. The pouch body 11 is adapted to receive the cellular phone 10 therein. The pouch body 11 includes a rear pouch wall 111, and a securing piece 113 fixed to an outer wall surface of the rear pouch wall 111 and cooperating with the rear pouch wall 111 to confine a clamping space. The securing piece 113 is formed with an insert slot 114 for access into the clamping space. The inverted U-shaped clip 12 has an anchoring plate portion 121 secured to the pouch body 11, a resilient engaging portion 124 disposed behind the anchoring plate portion 121, and a bridging plate portion 122 interconnecting upper ends of the anchoring and resilient engaging portions 121, 124. The anchoring plate portion 121 of the clip 12 extends into the clamping space via the insert slot 114, and is riveted to both the rear pouch wall 111 and the securing piece 113 by a fastener 120. The resilient engaging portion 124 is further formed with a barb end 125. The barb end 125 is used to retain the clip 12 on a belt 19 when the former engages the latter.

A main drawback of the pouch assembly 1 resides in that, when the user is riding a motorcycle or bicycle, it is inconvenient for the user to access the cellular phone that is clipped on the belt of the user.

SUMMARY OF THE INVENTION

Therefore, the main object of the present invention is to provide a cellular phone pouch assembly that is adapted to be mounted on a bar, such as a motorcycle or bicycle handlebar, for ready access by the user.

Accordingly, the pouch assembly of this invention is adapted to hold a cellular phone and is adapted to be mounted on a bar. The pouch assembly includes a pouch body, an inverted U-shaped clip, a bar clamping member, a slideable coupling device, and an interlocking device. The pouch body is adapted to receive the cellular phone there in. The inverted U-shaped clip has an anchoring plate portion secured to the pouch body, a resilient engaging portion disposed behind the anchoring plate portion, and a bridging plate portion interconnecting upper ends of the anchoring and resilient engaging portions. The bar clamping member includes a base wall portion and a bar clamp portion connected to the base wall portion and adapted to clamp the bar. The slideable coupling device is formed on and couples slideably and removably the resilient engaging portion of the clip and the base wall portion of the bar clamping member. The interlocking device is provided on and locks releasably the base wall portion of the bar clamping member against sliding movement relative to the resilient engaging portion of the clip.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
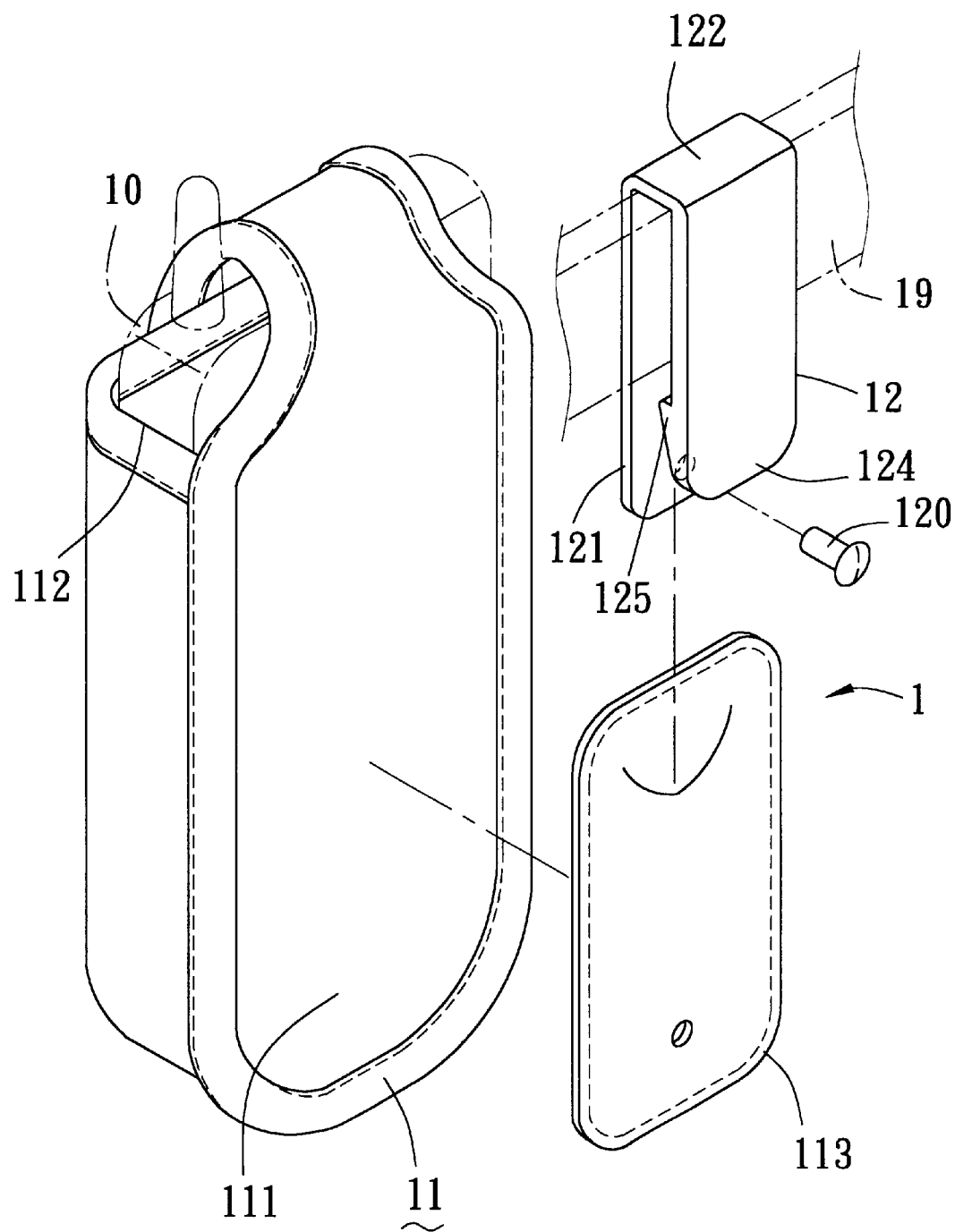
FIG. 1 is an exploded perspective view of a conventional pouch assembly for holding a cellular phone.
Figure 2:
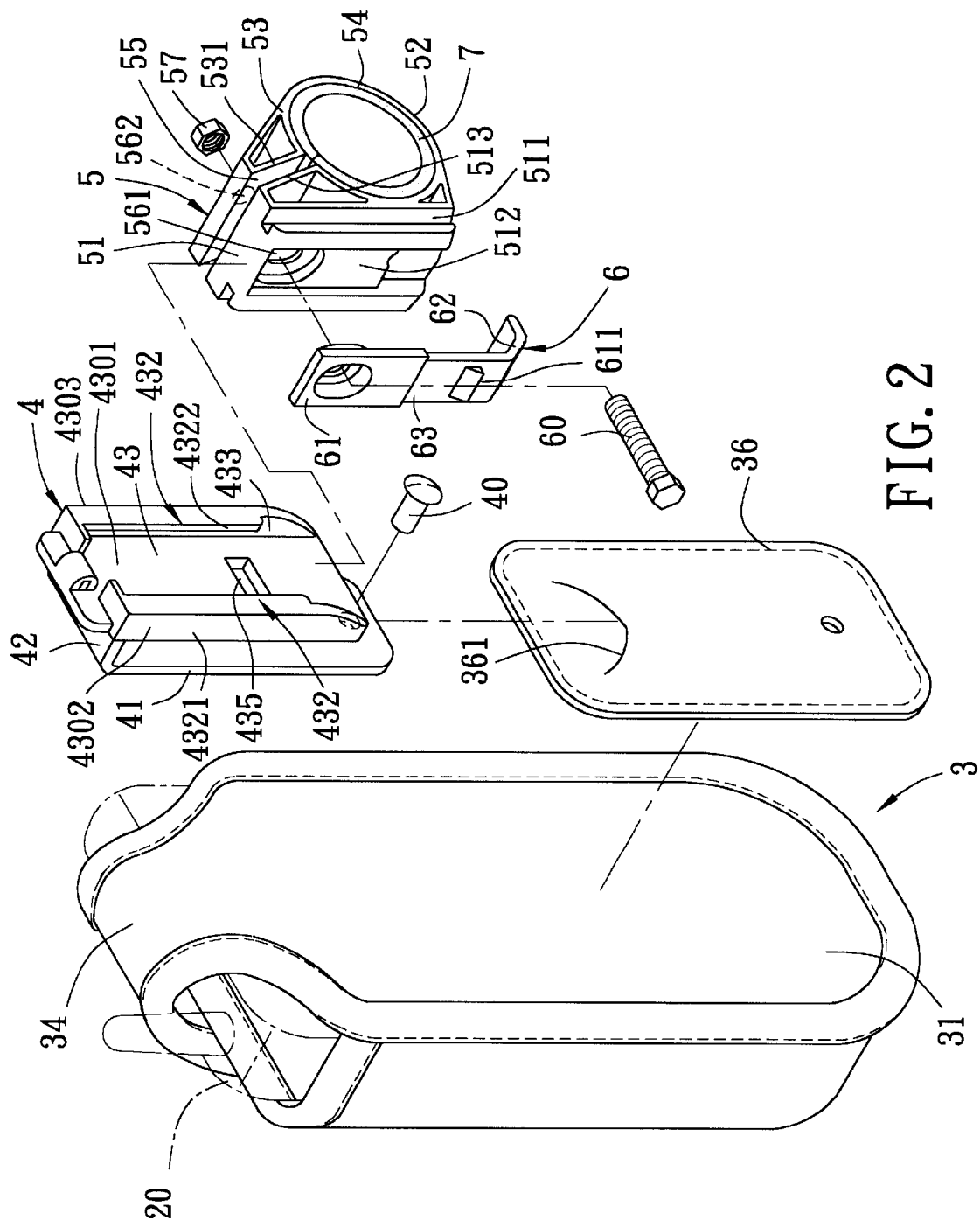
FIG. 2 is an exploded perspective view of the preferred embodiment of a pouch assembly for holding a cellular phone according to the present invention.
Figure 3:
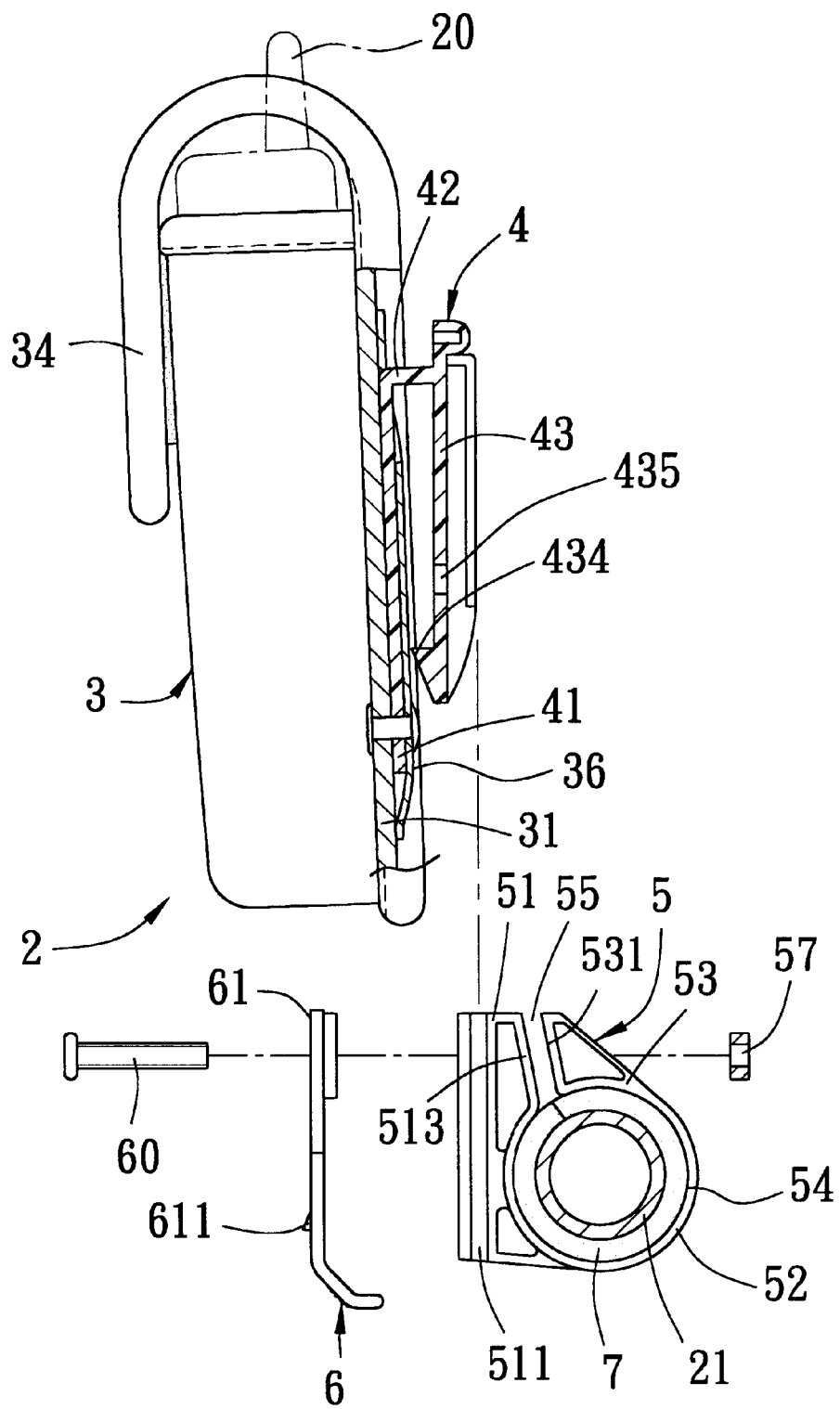
FIG. 3 is an exploded partly sectional schematic side view of the preferred embodiment.
Figure 4:
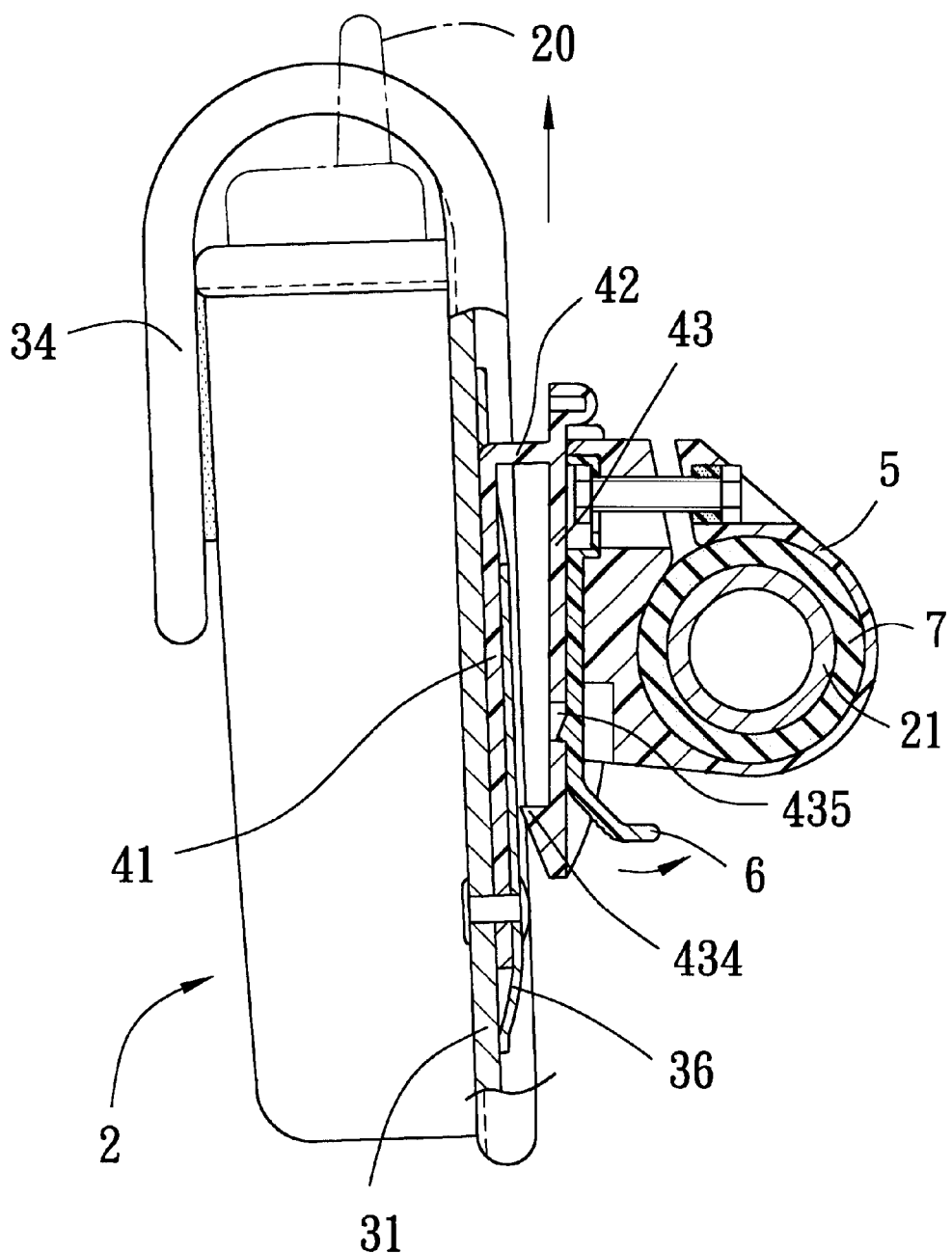
FIG. 4 is an assembled partly sectional schematic side view of the preferred embodiment when mounted on a bar.

Referring to FIGS. 2, 3 and 4, the preferred embodiment of a pouch assembly 2 according to the present invention is shown to be adapted to hold a cellular phone 20 and to be mounted on a bar 21, such as a motorcycle or bicycle handlebar. The pouch assembly 2 includes a pouch body 3, an inverted U-shaped clip 4, a bar clamping member 5, a slideable coupling device, and an interlocking device 6.

The pouch body 3 is adapted to receive the cellular phone 20 therein, and is formed by sewing together fabric pieces. The pouch body 3 includes a rear pouch wall 31 and a securing piece 36 fixed to an outer wall surface of the rear pouch wall 31, such as by stitching, and cooperating with the rear pouch wall 31 to confine a clamping space. The rear pouch wall 31 is further formed with an extension flap 34 to retain the cellular phone 20 therein. The securing piece 36 is formed with an insert slot 361 for access into the clamping space.

Figure 5:
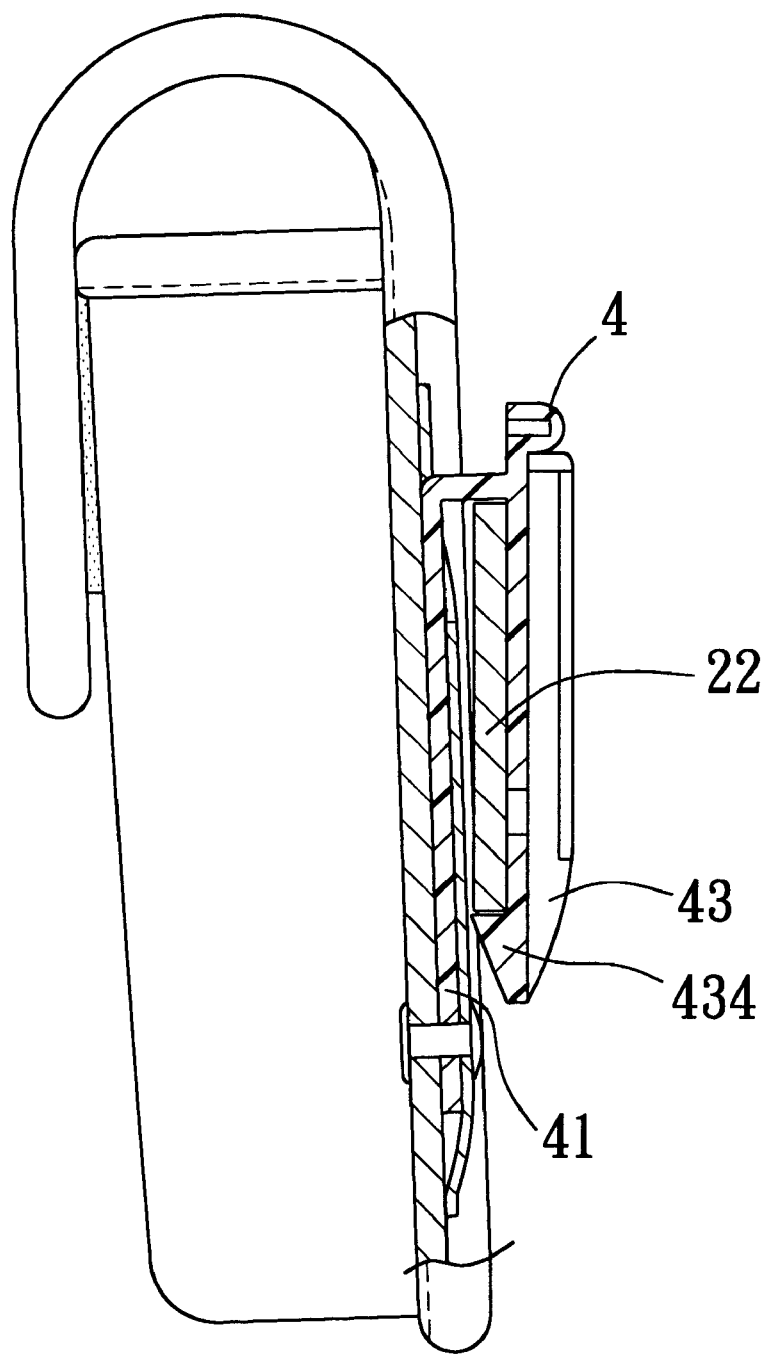
FIG. 5 is a schematic side view of the preferred embodiment when removed from the bar.

The inverted U-shaped clip 4 is integrally formed from a plastic material, and has an anchoring plate portion 41 secured to the pouch body 3, a resilient engaging portion 43 disposed behind the anchoring plate portion 41, and a bridging plate portion 42 interconnecting upper ends of the anchoring and resilient engaging portions 41,43. The anchoring plate portion 41 of the clip 4 extends into the clamping space via the insert slot 361, and is riveted to both the rear pouch wall 31 and the securing piece 36 by a fastener 40. The resilient engaging portion 43 is further formed with a barb end 434 to permit retention of the clip 4 on a belt 22, as shown in FIG. 5.

The bar clamping member 5 includes a base wall portion 51 and a bar clamp portion connected to the base wall portion 51 and adapted to clamp the bar 21. The bar clamp portion is formed as a curved wall portion 52 that curves upwardly from a lower end of the base wall portion 51 toward an upper end 513 of the base wall portion 51. The bar clamp portion cooperates with the base wall portion 51 to confine a bar receiving space 54 adapted for receiving a portion of the bar 21 therein. The bar clamp portion has a distal section 53 that cooperates with the upper end 513 of the base wall portion 51 to confine a gap 55 communicated with the bar receiving space 54. The upper end 513 of the base wall portion 51 is formed with a first fastener hole 561. The distal section 53 of the bar clamp portion is formed with an upward extension 531. The upward extension 531 is formed with a second fastener hole 562 that is registered with the first fastener hole 561. The pouch assembly 2 further comprises a screw fastener including a nut 57 and a screw 60. The screw fastener extends through the first and second fastener holes 561,562 to tighten the upward extension 531 toward the upper end 513 of the base wall portion 51. A cushioning ring 7 is disposed in the bar receiving space 54 and is adapted to be sleeved on the portion of the bar 21.

The slideable coupling device is formed on and couples slideably and removably the resilient engaging portion 43 of the clip 4 and the base wall portion 51 of the bar clamping member 5. The resilient engaging portion 43 of the clip 4 has an outer wall surface 4301, and opposite lateral edges 4302,4303 formed respectively with a pair of slide rails 432 therealong. Each of the slide rails 432 has a first rail portion 4321 that extends transversely from the outer wall surface 4301, and a second rail portion 4322 that is transverse to the first rail portion 4321 and that extends toward the other one of the slide rails 432. The slide rails 432 cooperate with the outer wall surface 4301 to confine a dovetail groove 433. Moreover, the base wall portion 51 of the bar clamping member 5 has opposite lateral sides formed respectively with a pair of slide grooves 511 therealong to form the base wall portion 51 with a dovetail projection that engages slideably and removably the dovetail groove 433. The dovetail projection and the dovetail groove 433 constitute the slideable coupling device.

Referring again to FIG. 2, the resilient engaging portion 43 of the clip 4 is further formed with a locking hole 435 therethrough. The base wall portion 51 of the bar clamp member 5 is formed with a spring retaining recess 512. The interlocking device 6 is provided on and locks releasably the base wall portion 51 of the bar clamping member 5 against sliding movement relative to the resilient engaging portion 43 of the clip 4. The interlocking device 6 includes an elongate spring plate received in the spring retaining recess 512 and having an upper fixing portion 61 secured to the upper end 513 of the base wall portion 51 of the bar clamping member 5 by the screw 60, a lower operating portion 62 disposed below the bar clamping member 5, and an intermediate portion 63 interconnects the fixing and operating portions 61, 62. The intermediate portion 63 is formed with a locking projection 611 for engaging removably the locking hole 435. The spring retaining recess 512 is configured to permit the intermediate portion 63 to move away from the clip 4 so as to disengage the locking projection 611 from the locking hole 435 upon operation of the operating portion 62.

It is noted that, when the user is riding a motorcycle or bicycle, the user can readily access the cellular phone 20 by mounting the pouch assembly 2 on the motorcycle or bicycle handlebar, as shown in FIG. 4. By virtue of the interlocking device 6 and the slideable coupling device, the clip 4 can be removed from the bar clamping member 5 so that the cellular phone 20 can be retained on the belt 22 of the user, as shown in FIG. 5.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A pouch assembly adapted to hold a cellular phone and adapted to be mounted on a bar, comprising:
   a pouch body adapted to receive the cellular phone therein;
   an inverted U-shaped clip having an anchoring plate portion secured to said pouch body, a resilient engaging portion disposed behind said anchoring plate portion, and a bridging plate portion interconnecting upper ends of said anchoring and resilient engaging portions;
   a bar clamping member including a base wall portion and a bar clamp portion connected to said base wall portion and adapted to clamp the bar;
   a slideable coupling device formed on and coupling slideably and removably said resilient engaging portion of said clip and said base wall portion of said bar clamping member; and
   an interlocking device provided on and locking releasably said base wall portion of said bar clamping member against sliding movement relative to said resilient engaging portion of said clip.

2. The pouch assembly of claim 1, wherein:
   said pouch body includes a rear pouch wall, and a securing piece fixed to an outer wall surface of said rear pouch wall and cooperating with said rear pouch wall to confine a clamping space, said securing piece being formed with an insert slot for access into said clamping space;
   said anchoring plate portion of said clip extending into said clamping space via said insert slot and being riveted to both said rear pouch wall and said securing piece.

3. The pouch assembly of claim 1, wherein said bar clamp portion is formed as a curved wall portion that curves upwardly from a lower end of said base wall portion toward an upper end of said base wall portion, said bar clamp portion cooperating with said base wall portion to confine a bar receiving space adapted for receiving a portion of the bar therein, said bar clamp portion having a distal section that cooperates with said upper end of said base wall portion to confine a gap communicated with said bar receiving space, said upper end of said base wall portion being formed with a first fastener hole, said distal section of said bar clamp portion being formed with an upward extension, said upward extension being formed with a second fastener hole that is registered with said first fastener hole, said pouch assembly further comprising a screw fastener that extends through said first and second fastener holes to tighten said upward extension toward said upper end of said base wall portion.

4. The pouch assembly of claim 3, further comprising a cushioning ring disposed in said bar receiving space and adapted to be sleeved on the portion of the bar.

5. The pouch assembly of claim 1, wherein said slideable coupling device includes a dovetail groove formed in one of said resilient engaging portion of said clip and said base wall portion of said bar clamping member, and a dovetail projection formed in the other one of said resilient engaging portion of said clip and said base wall portion of said bar clamping member, said dovetail projection engaging slideably and removably said dovetail groove.

6. The pouch assembly of claim 1, wherein:
   said resilient engaging portion of said clip is formed with a locking hole therethrough;
   said interlocking device including an elongate spring plate which has an upper fixing portion secured to said base wall portion of said bar clamping member, a lower operating portion disposed below said bar clamping member, and an intermediate portion interconnecting said fixing and operating portions, said intermediate portion being formed with a locking projection that engages removably said locking hole to lock said base wall portion of said bar clamping member against sliding movement relative to said resilient engaging portion of said clip.

7. The pouch assembly of claim 1, wherein:

said resilient engaging portion of said clip has an outer wall surface, and opposite lateral edges formed respectively with a pair of slide rails therealong, each of said slide rails having a first rail portion that extends transversely from said outer wall surface, and a second rail portion transverse to said first rail portion and extending toward the other one of said slide rails, said slide rails cooperating with said outer wall surface to confine a dovetail groove;

said base wall portion of said bar clamping member having opposite lateral sides formed respectively with a pair of slide grooves therealong to form said base wall portion with a dovetail projection that engages slideably and removably said dovetail groove;

said dovetail projection and said dovetail groove constituting said slideable coupling device.

8. The pouch assembly of claim 7, wherein:

said resilient engaging portion of said clip is formed with a locking hole therethrough;

said base wall portion of said bar clamp member being formed with a spring retaining recess;

said interlocking device including an elongate spring plate received in said spring retaining recess and having an upper fixing portion secured to said upper end of said base wall portion of said bar clamping member by said screw fastener, a lower operating portion disposed below said bar clamping member, and an intermediate portion interconnecting said fixing and operating portions, said intermediate portion being formed with a locking projection for engaging removably. said locking hole;

said spring retaining recess being configured to permit said intermediate portion to move away from said clip so as to disengage said locking projection from said locking hole upon operation of said operating portion.

* * * * *